(12) United States Patent
Fu et al.

(10) Patent No.: US 10,929,390 B2
(45) Date of Patent: Feb. 23, 2021

(54) METHOD AND APPARATUS FOR CORRECTING QUERY BASED ON ARTIFICIAL INTELLIGENCE

(71) Applicant: BEIJING BAIDU NETCOM SCIENCE AND TECHNOLOGY CO., LTD., Beijing (CN)

(72) Inventors: Zhihong Fu, Beijing (CN); Zengfeng Zeng, Beijing (CN); Qiugen Xiao, Beijing (CN); Jingzhou He, Beijing (CN); Lei Shi, Beijing (CN); Pengkai Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 489 days.

(21) Appl. No.: 15/677,612

(22) Filed: Aug. 15, 2017

(65) Prior Publication Data
US 2018/0144024 A1    May 24, 2018

(30) Foreign Application Priority Data

Nov. 22, 2016    (CN) .......................... 201611048764.3

(51) Int. Cl.
*G06F 15/16*    (2006.01)
*G06F 16/242*    (2019.01)
(Continued)

(52) U.S. Cl.
CPC ........ *G06F 16/243* (2019.01); *G06F 16/2453* (2019.01); *G06F 16/951* (2019.01);
(Continued)

(58) Field of Classification Search
None
See application file for complete search history.

(56) References Cited

U.S. PATENT DOCUMENTS

| | | | |
|---|---|---|---|
| 8,868,587 B1* | 10/2014 | Subramaniam | G06F 16/3331 707/759 |
| 2006/0074892 A1* | 4/2006 | Davallou | G06F 16/30 |
| 2015/0286708 A1* | 10/2015 | Tao | G06F 16/334 707/730 |

FOREIGN PATENT DOCUMENTS

CN        105550171 A        5/2016

OTHER PUBLICATIONS

Office Action issued in corresponding Chinese Application No. 201611048764.3 dated Dec. 11, 2018, and English translation thereof (20 pages).

* cited by examiner

*Primary Examiner* — Alex Gofman
(74) *Attorney, Agent, or Firm* — Osha Bergman Watanabe & Burton

(57) ABSTRACT

A method and an apparatus for correcting a query based on artificial intelligence, including: receiving a first query input by a user, and judging whether the first query satisfies an error correcting condition according to a preset error correcting strategy; determining a first segment to be corrected in the first query if the first query satisfies the error correcting condition; acquiring one or more first candidate results corresponding to the first segment according to a preset candidate recalling strategy; determining an error correcting result corresponding to the first segment according to quality feature values of the one or more first candidate results; and performing an error correction on the first query according to the error correcting result, and generating a second query.

12 Claims, 3 Drawing Sheets

(51) Int. Cl.
    *G06N 5/04*          (2006.01)
    *G06F 16/951*      (2019.01)
    *G06F 16/2453*     (2019.01)
    *G06F 40/205*      (2020.01)
    *G06F 40/232*      (2020.01)

(52) U.S. Cl.
    CPC .......... *G06F 40/205* (2020.01); *G06F 40/232* (2020.01); *G06N 5/048* (2013.01)

METHOD AND APPARATUS FOR CORRECTING QUERY BASED ON ARTIFICIAL INTELLIGENCE

CROSS-REFERENCE TO RELATED APPLICATION

This application claims priority to and benefits of Chinese Patent Application Serial No. 201611048764.3, filed with the State Intellectual Property Office of P. R. China on Nov. 22, 2016, the entire content of which is incorporated herein by reference.

FIELD

The present disclosure relates to a field of information search technology, and more particularly to a method and an apparatus for correcting a query based on artificial intelligence.

BACKGROUND

Artificial intelligence (AI for short) is a new technology for studying and developing theories, methods, technologies and application systems for simulating and extending intelligence of human. AI is a branch of computer technology, intending to know essence of intelligence and to produce an intelligent machine acting in a way similar to that of human intelligence. Researches on the AI field include robots, speech recognition, image recognition, natural language processing and expert system etc., in which the natural language processing is a significant aspect of AI and has been widely applied in a search engine technology.

With the popularization of the internet, information in the internet becomes richer, and a user can conveniently obtain desired information via a search engine. In general, wrong queries may be input when the user queries information because of inattentive and heedless. For example, "清华大学"), is input as "情华大学" (a font error), or as "亲华大学" (a spelling error), or as "清华学" (an information losing error) etc. Thus, it is desirable for the search engine to identify errors in a query input buy the user, and to correct the errors.

SUMMARY

Embodiments of the present disclosure seek to solve at least one of the problems existing in the related art to at least some extent.

For this, embodiments of a first aspect of the present disclosure provide a method for correcting a query based on artificial intelligence. The method includes: receiving a first query input by a user, and judging whether the first query satisfies an error correcting condition according to a preset error correcting strategy; determining a first segment to be corrected in the first query if the first query satisfies the error correcting condition; acquiring one or more first candidate results corresponding to the first segment according to a preset candidate recalling strategy; determining an error correcting result corresponding to the first segment according to quality feature values of the one or more first candidate results; and performing an error correction on the first query according to the error correcting result, and generating a second query.

Embodiments of a second aspect of the present disclosure provide an apparatus for correcting a query based on artificial intelligence. The apparatus includes: a judging module, configured to receive a first query input by a user, and to judge whether the first query satisfies an error correcting condition according to a preset error correcting strategy; a first determining module, configured to determine a first segment to be corrected in the first query if the first query satisfies the error correcting condition; a second determining module, configured to determine an error correcting result corresponding to the first segment; and a generating module, configured to perform an error correction on the first query according to the one or more error correcting results, and to generate a second query.

Embodiments of a third aspect of the present disclosure provide a device for correcting a query based on artificial intelligence, including: a processor; a memory for storing instructions executed by the processor, in which the processor is configured to perform the method according to the embodiments of the first aspect of the present disclosure.

Embodiments of a fourth aspect of the present disclosure provide a non-transitory computer readable storage medium for storing instructions, when executed by one or more processors in a mobile terminal, causing the mobile terminal to execute the method according to the embodiments of the first aspect of the present disclosure.

Embodiments of a fifth aspect of the present disclosure provide a computer program product, when instructions in the computer program product are executed by the processor, executing the method according to the embodiments of the first aspect of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
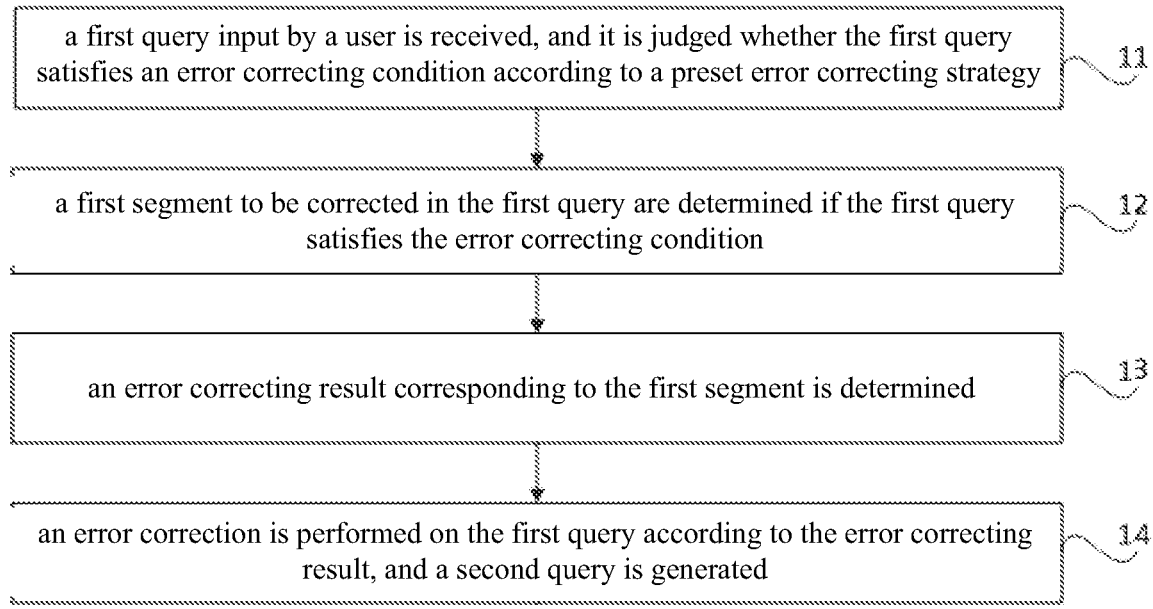
FIG. 1 is a flow chart of a method for correcting a query based on artificial intelligence according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The method and device for correcting a query based on artificial intelligence according to embodiments of the present disclosure will be described with reference to drawings.

FIG. 1 is a flow chart of a method for correcting a query based on artificial intelligence according to an embodiment of the present disclosure.

As shown in FIG. 1, the method for correcting a query based on artificial intelligence includes following acts.

In block S11, a first query input by a user is received, and it is judged whether the first query satisfies an error correcting condition according to a preset error correcting strategy.

In some embodiments, an execution subject of the method for correcting searching query based on artificial intelligence is an apparatus for correcting searching query based on artificial intelligence, which may be applied in a terminal device with a search function. There are various terminal devices, such as a smart phone, a tablet, a computer etc.

When the first query is received, the first query is analyzed according to the preset error correcting strategy, such that it is judged whether the first query satisfies the error correcting condition. If the first query fails to satisfy the error correcting condition, a search is directly performed according to the first query and search results are fed back to the user. If the first query satisfies the error correcting condition, an error correction is performed on the first query.

It should be noted that the error correcting strategy may be set according to different application requirements.

In a first example, it is judged whether the first query satisfies the error correcting condition according to a history behavioral feature corresponding to the first query.

The history behavioral feature includes: history search times, history click times and a reading period. In some embodiments, history search information (such as history search times, history click times and a reading period) of each query may be stored in the apparatus, such that it may be judged after the first query is received whether the history search times corresponding to the first query is larger than a certain value, whether history clicking times on search results corresponding to the first query is enough (for example, larger than a preset number), or whether the reading period is long enough (for example, larger than a preset length) by searching the history search information. Therefore, it may be judged that whether it is necessary to perform the error correction on the first query.

In general, there is no need to perform the error correction on a query if the history search times corresponding to the query is enough (for example, larger than the certain value), which means that the query is roughly correct. Alternatively, if the search results acquired according to the query are clicked by the user repeatedly in history searches, which means that the search results are correct and satisfy requirements of the user, the query is regarded to be roughly correct. Alternatively, if the reading period for the search results corresponding to the query is long enough, which means that the search results satisfy the requirements of the user, it can be regarded that the query is roughly correct, thus it is not necessary to perform the error correction on the query.

In a second example, it is judged whether the first query satisfies the error correcting condition according to a language model value of the first query.

In some embodiments, it may be judged by an apparatus for correcting a query whether the there is a same or similar description corresponding to the first query in history queries, so as to determine the language model value of the first query. For example, a language model may be determined by statistically analyzing titles of search results in a search base and history queries via the apparatus for correcting a query. And then, the first query may be input into the language model to compute the language model value of the first query.

It should be noted that the error correcting strategies mentioned above are merely examples, which may be set or adjusted according to practical application requirements.

In block S12, a first segment to be corrected in the first query are determined if the first query satisfies the error correcting condition.

In some embodiments, since the query is usually a long string in which only one or more words may be spelt incorrectly, the error correction processing may be only performed on the incorrect part rather than all words in the query, such that a low efficiency is avoided. Therefore, the first query may be parsed and the first segment to be corrected in the first query may be determined when the first query satisfies the error correcting condition.

The first segment may be one word or one phrase, or may be a plurality of words or a plurality of phrases, which will not be limited in the present disclosure.

It may be understood that segmentation can be performed on the first query to determine a plurality of second segments included in the first query firstly when the first segment to be corrected in the first query is determined. It may be judged thereafter whether the error correcting processing is needed to be performed on the plurality of second segments, i.e., the block S102 includes following acts.

In block S12, the segmentation is performed on the first query and the plurality of second segments included in the first query is determined, and the segment to be corrected is determined from the plurality of second segments according to history error correcting information and a language model value of each of the plurality of second segments.

In some embodiments, the plurality of second segments include segments of all kinds of granularities in the first query may be acquired after the segmentation is performed on the first query by the apparatus for correcting a query.

For example, if the first query is "Beijing map Line 1", the plurality of second segments including "Beijing", "map", "Line 1", "Beijing map" and "map Line 1" is acquired after the segmentation is performed on the first query. It may be judged by the apparatus for correcting a query whether the error correcting processing is needed to be performed on the plurality of second segments according to the history error correcting information and language model values of the plurality of second segments. By querying the history error correcting information, it is determined that "map Line 1" exists in history error corrections but other segments do not. After a language model value of "map Line 1" is computed, it is determined that the language model value of "map Line 1" is low. Thus, "map Line 1" is determined as a first segment to be corrected included in the first query.

It should be noted that the first segment to be corrected may be determined by the apparatus for correcting a query from the plurality of second segments only when the history error correcting information satisfies the correcting condition, or the first segment to be corrected may be determined by the apparatus for correcting a query from the plurality of second segments only when a language model value of a second segment satisfies the correcting condition, or the first segment to be corrected may be determined by the apparatus for correcting a query from the plurality of second segments when both the history error correcting information and a language model value of a second segment satisfy the correcting condition, which will not be limited in the present disclosure.

Further, information included in segments with a large granularity is more precise than that included in segments with a small granularity. Therefore, in order to improve error correction efficiency, it may be judged by the apparatus firstly whether the error correction is needed to be performed on the segments with the lager granularity. If a segment with the large granularity is determined as a segment to be corrected, it may be considered that the error correction is not necessary to be performed on the segments with the small granularity since a correct query may be acquired after the segment with the large granularity is corrected. Determining the first segment to be corrected from the plurality of second segments according to the history error correction information and the language model values of the plurality of second segments further includes following acts.

It is judged whether the history error correcting information and the language model values of the plurality of second segments satisfy the error correcting condition successively in a descending order of granularity. A second segment with the large granularity is determined as the first segment to be corrected if history error correcting information and a language model value of the second segment with the large granularity satisfy the error correcting condition. A second segment with the small granularity included in the second segment with the large granularity is eliminated from the plurality of second segments.

For example, in the above example, the segments "map" and "Line 1" are not needed to be judged after "map Line 1" is determined by the apparatus as a segment to be corrected, such that a processing procedure performed by the apparatus may be simplified and the error correction efficiency may be improved.

In block 13, an error correcting result corresponding to the first segment is determined.

In some embodiments, the error correcting result corresponding to the first segment may be determined by various methods.

In an embodiment of the present disclosure, the error correcting result corresponding to the first segment may be determined by following acts. One or more first candidate results corresponding to the first segment are acquired according to a preset candidate recalling strategy. An error correcting result corresponding to the first segment is determined according to quality feature values of the one or more first candidate results.

In another embodiment of the present disclosure, the error correcting result corresponding to the first segment may be determined by following acts. It is searched in a history error correcting information base, and one or more second candidate results corresponding to the first segment are acquired, in which a confidence coefficient of each of the one or more second candidate results is greater than a first preset value. An accuracy score of each of the one or more second candidate results is determined according to a matching degree between each of the one or more second candidate results and the first query. It is judged whether there is at least one accuracy score greater than a second preset value. If there is at least one accuracy score greater than the second preset value, a second candidate result with a highest accuracy score is determined as the error correcting result.

In block S14, an error correction is performed on the first query according to the error correcting result, and a second query is generated.

In some embodiments, the error correction may be performed on the first query according to the error correcting result after the error correcting result is determined by the apparatus, such that the second query may be generated and fed back to the user.

With the method according to embodiments of the present disclosure, after the first query input by the user is received and it is determined that the first query satisfies the error correcting condition according to the preset error correcting strategy, the first segment to be corrected in the first query may be determined firstly, and the correcting result corresponding to the first segment may be determined, and then the error correction may be performed on the first query according to the error correcting result, so as to generate the second query. With the method according to the present disclosure, it may be accurately determined whether there is an error in the query by using history data, the error correcting results may be precisely determined by screening the candidate results, thus improving error correction efficiency and accuracy of the search engine, saving searching time of the user and improving experience of the user.

Figure 2:
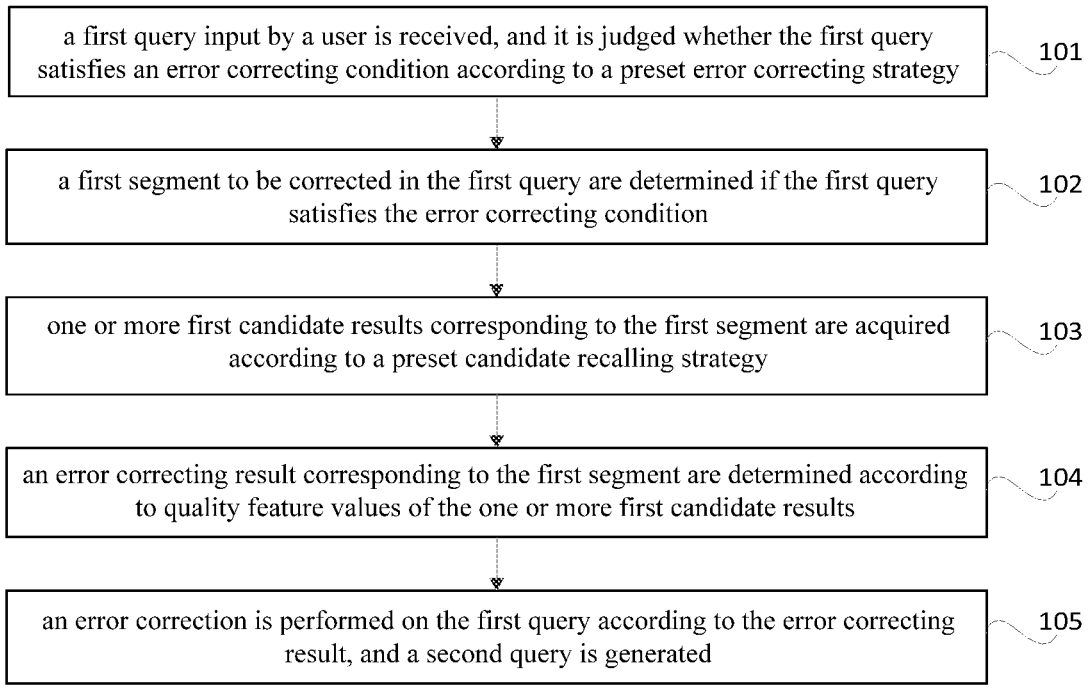
FIG. 2 is a flow chart of a method for correcting a query based on artificial intelligence according to another embodiment of the present disclosure.

FIG. 2 is a flow chart of a method for correcting a query based on artificial intelligence according to another embodiment of the present disclosure.

As shown in FIG. 2, the method for correcting a query based on artificial intelligence includes following acts.

In block S101, a first query input by a user is received, and it is judged whether the first query satisfies an error correcting condition according to a preset error correcting strategy.

In block S102, the segmentation is performed on the first query and the plurality of second segments included in the first query is determined, and the segment to be corrected is determined from the plurality of second segments according to history error correcting information and a language model value of each of the plurality of second segments.

In block 103, one or more first candidate results corresponding to the first segment are acquired according to a preset candidate recalling strategy.

In some embodiments, various preset candidate recalling strategies may be used by the apparatus to recall candidate results corresponding to the segments to be corrected.

For example, the one or more first candidate results corresponding to the first segment are acquired according to the history error correcting information or a preset candidate list, which will not be limited in the present disclosure.

In block S104, an error correcting result corresponding to the first segment are determined according to quality feature values of the one or more first candidate results.

A quality feature of a first candidate result includes a frequency of the first candidate result, history behavioral features (such as search times, click times and error correction times) corresponding to the first candidate result, context features of the first candidate result in the query, whether the first candidate is a proper noun, and whether the first candidate is a site name, etc. The frequency of the first candidate result is a frequency in click logs in history searches of the first candidate result.

In some embodiments, a first candidate result with a highest quality feature value may be determined as the error correcting result corresponding to the first segment after the apparatus determines the quality feature values of the one or more first candidate results.

In block S105, an error correction is performed on the first query according to the error correcting result, and a second query is generated.

In some embodiments, the error correction may be performed on the first query according to the error correcting result after the error correcting result is determined by the apparatus, such that the second query may be generated and fed back to the user.

With the method according to embodiments of the present disclosure, after the first query input by the user is received and it is determined that the first query satisfies the error correcting condition according to the preset error correcting strategy, the first segment to be corrected in the first query may be determined firstly, and one or more first candidate results corresponding to the first segment may be acquired according to the preset candidate recalling strategy thereafter. Then, the correcting result corresponding to the first segment may be determined according to quality feature values of the one or more first candidate results, and the error correction may be performed on the first query according to the error correcting result, so as to generate the second query. With the method according to the present disclosure, it may be accurately determined whether there is an error in the query by using history data, the error correcting results may be precisely determined by screening the candidate results, thus improving error correction efficiency and accuracy of the search engine, saving searching time of the user and improving experience of the user.

According to the above description, the apparatus may use the preset candidate recalling strategy to acquire the candidate results corresponding to a segment to be corrected after it is judged that the query input by the user needs to be corrected. The error correcting result corresponding to the segment may be determined according to quality feature values of the candidate results thereafter, such that the query may be corrected. The candidate recalling strategy will be described in detail with respect to FIG. 3.

Figure 3:
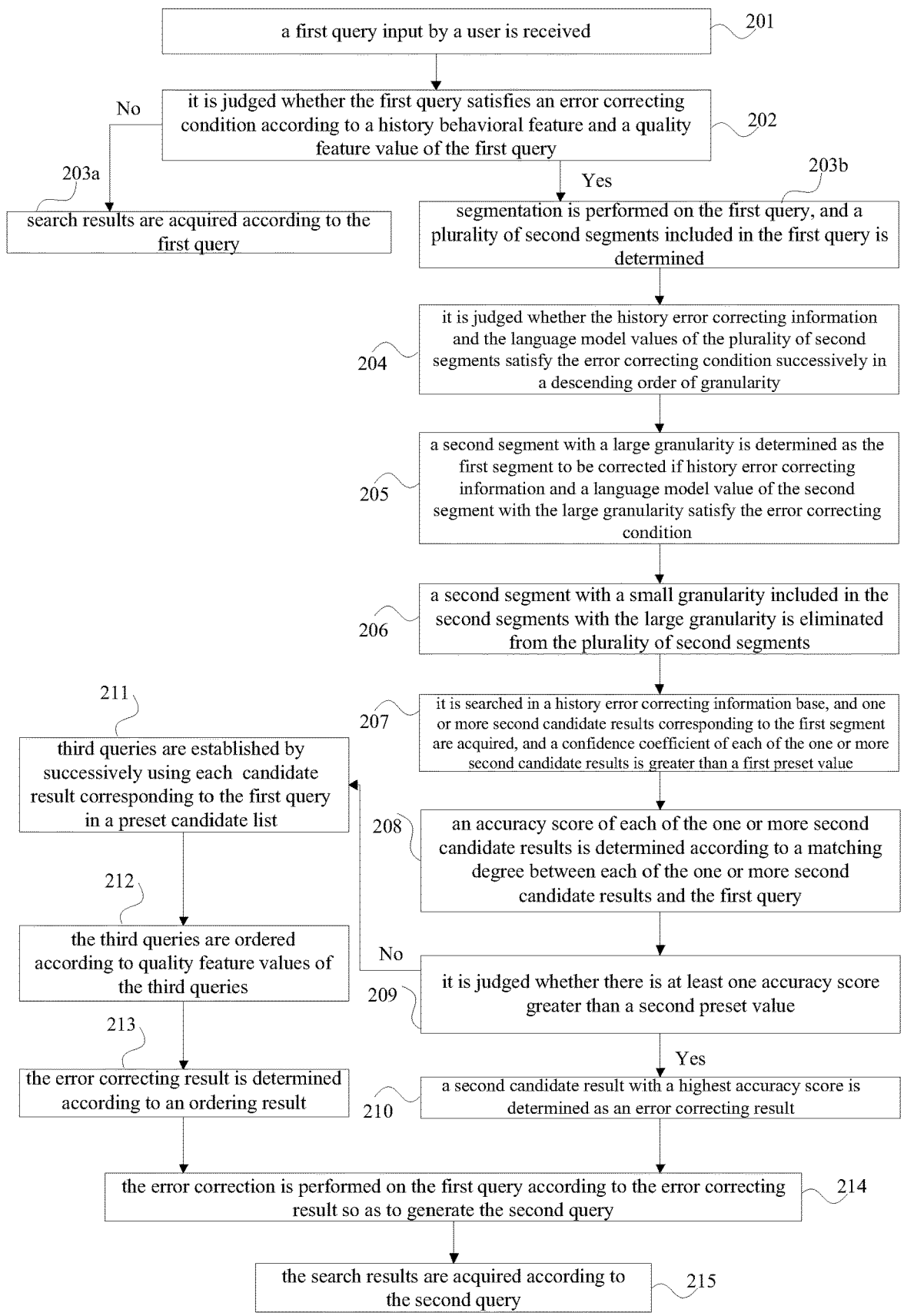
FIG. 3 is a flow chart of a method for correcting a query based on artificial intelligence according to another embodiment of the present disclosure.

FIG. 3 is a flow chart of a method for correcting a query based on artificial intelligence according to another embodiment of the present disclosure.

As shown in FIG. 3, the method includes following acts.

In block 201, a first query input by a user is received.

In block 202, it is judged whether the first query satisfies an error correcting condition according to a history behavioral feature and a quality feature value of the first query.

If the first query satisfies the error correcting condition, block 203a will be executed; if the first query fails to satisfy the error correcting condition, block 203b will be executed.

In block 203a, search results are acquired according to the first query.

In block 203b, segmentation is performed on the first query, and a plurality of second segments included in the first query is determined.

In block 204, it is judged whether the history error correcting information and the language model values of the plurality of second segments satisfy the error correcting condition successively in a descending order of granularity.

In block 205, a second segment with a large granularity is determined as the first segment to be corrected if history error correcting information and a language model value of the second segment with the large granularity satisfy the error correcting condition.

In block 206, a second segment with a small granularity included in the second segments with the large granularity is eliminated from the plurality of second segments.

In some embodiments, implementation procedures of block 201 to block 206 are described by reference to the detail description of the above embodiments, which will not be described herein.

In block 207, it is searched in a history error correcting information base, and one or more second candidate results corresponding to the first segment are acquired.

A confidence coefficient of each of the one or more second candidate results is greater than a first preset value. History segments to be corrected, error correcting results and confidence coefficients corresponding to the error correcting results are stored in the history error correcting information base. In general, a segment to be corrected may correspond to several error correcting results and the confidence coefficients corresponding to the several error correcting results respectively are different. The error correcting results corresponding to the first segment may be acquired by searching in the history error correcting information base after the first segment is determined by the apparatus.

Further, in order to improve the error correction efficiency of the apparatus, the apparatus may only select error correcting results with a higher confidence coefficient as the second candidate results.

The first preset value may be set in advance, or may be determined by the apparatus according to semanteme of the first query and a degree of importance of the first segment to be corrected in the first query.

For example, the first query input by the user is "北京无麦" (Beijing haza). The apparatus parses the first query and determines the first segment to be corrected is "无麦" (haza), and determines the error correcting results and the confidence coefficients thereof are "雾霾" (haze) −0.7, "外卖" (hazel) −0.5, "呼麦" (haz) −0.2 respectively by searching in the history error correcting information base. After that, the apparatus may determine that the first segment is important to the first query according to the semanteme and the structure of the first query and a position of the first segment in the first query. Thus, candidate results are required to be recalled as more as possible. If the first preset value is 0.4, the second candidate results are "雾霾" (haze) and 外卖 (hazel).

In block 208, an accuracy score of each of the one or more second candidate results is determined according to a matching degree between each of the one or more second candidate results and the first query.

In some embodiments, the matching degree between each of the one or more second candidate results and the first query may be determined in various ways by the apparatus.

In a first example, the matching degree between each of the one or more second candidate results and the first query may be determined according to a preset candidate estimating model.

In some embodiments, the apparatus may train according to history features, context corpus and speech model corresponding to various queries to acquire the candidate estimating model. Scores corresponding to the candidate results may be acquired via the candidate estimating model according to the second candidate results and the context of the first query. The higher a score is, the higher a matching degree between a corresponding second candidate result and the first query is. Thus, the accuracy of the second candidate result is higher.

In a second example, the segment in the first query is replaced by the one or more second candidate results respectively, so as to acquire new queries.

The matching degree between each of the one or more second candidate results and the first query is determined according to history features of a corresponding new query and the history behavioral features of the user.

For example, the new queries may be determined as "北京雾霾" (Beijing haze) and "北京外卖" (Beijing hazel) after the second candidate results "雾霾" (haze) and "外卖" (hazel) are determined by the apparatus. Then, the matching degree between each of the second candidate results and the first query may be determined according to the history search times and the click times of the new queries, and the history search information of the user (such as the search times of Beijing weather by the user, and the search times of Beijing hazel by the user).

In a possible implementation of embodiments of the present disclosure, the apparatus may adjust confidence coefficients of candidate results in the history correcting information base in combination with a current ranking result of queries. For example, search times of "雾霾" (haze) may be high when weather of Beijing is bad, thus a confidence coefficient corresponding to "雾霾" (haze) may be raised. Alternatively, search times of "外卖" (hazel) may be high when a new application of "外卖" (hazel) appears, or when news related to "外卖" (hazel) happens, thus a confidence coefficient corresponding to "hazel" may be raised.

In block 209, it is judged whether there is at least one accuracy score greater than a second preset value.

If yes, block 201 will be executed; if no, block 211 will be executed.

In block 210, a second candidate result with a highest accuracy score is determined as an error correcting result.

In some embodiments, the apparatus may preset a threshold for judging whether a correct error correcting result is recalled. A second candidate result may be regarded as the correct error correcting result if an accuracy score of the second candidate result is greater than the threshold, such that the error correction processing may be finished. Accordingly, candidate results may be further recalled according to fonts and spellings of the first segment if the accuracy score of the second candidate result is smaller than the threshold.

In block 211, third queries are established by successively using each candidate result corresponding to the first query in a preset candidate list.

The preset candidate list includes candidate terms of similar to the first segment in font or pronunciation.

In block 212, the third queries are ordered according to quality feature values of the third queries.

In block 213, the error correcting result is determined according to an ordering result.

In some embodiments, since the preset candidate list may include a plurality of candidate terms similar to the first segment in font or pronunciation, the apparatus may select the error correcting results from the candidate results according to the quality features of the third queries established by using the candidate results corresponding to the first query in the preset candidate list, so as to reduce the processing burden of the apparatus.

The quality features of the third queries may be determined according to quality features of the candidate results corresponding to the first query in the preset candidate list, quality features of the first segments, features of a combination of the first segments and the candidate results corresponding to the first query in the preset candidate list, and the history behavioral features of the current user.

For example, the quality of the candidate result corresponding to the first query in the preset candidate list is determined to be high if the search frequency of the candidate result is high, or if the candidate result is clicked for many times in history, or if the candidate result is a proper noun or a site name, and so on.

In some embodiments, the apparatus may acquire an ordering model for ordering the third queries by using a pairwise training in learning to rank (LTR for short). After the third queries are ordered, the candidate results ranked on top may be selected as the error correcting result from the ordering result. Thus, efficiency of ordering the candidate results may be improved effectively and the efficiency of the apparatus for correcting errors may be increased as well.

In block 214, the error correction is performed on the first query according to the error correcting result so as to generate the second query.

In block 215, the search results are acquired according to the second query.

It should be noted that the apparatus may parse the error correcting result according to the quality feature of the error correcting results after the error correcting result is determined. An error correcting way may be determined according to the parsing result so as to correct the first query. For example, if the quality feature of the error correcting result is high, the first segment may be displaced by the error correcting result directly so as to generate a second query. If the quality feature of the error correcting result is low, a supplement processing, a deleting processing or a reordering processing may be performed on the first query according to the error correcting results when the error correction is performed on the first query, such that the second query acquired is more precisely.

Further, since search information (such as queries, error correcting results, click data and search results) in a time period may be stored in the search engine, an exit processing is performed on the search information corresponding to the query stored in the search engine if the apparatus determines that the first query satisfies the error correcting condition in the above way. Thus, following act is included before block 203b.

An exit processing is performed on the error correcting result corresponding to the first query.

The exit processing can also be interpreted as a post processing, that is, when the search information indicates that there is external data (or feedback information of the user, such as click data in a search) different from the error correcting result corresponding to the first query, but having a higher creditability, the error correcting result corresponding to the first query can be replaced by the external data.

With the method according to embodiments of the present disclosure, after the first query input by the user is received, it is first judged whether the first query satisfies the error correcting condition according to the history behavioral feature and the quality feature value of the first query, after it is determined that the first query satisfies the error correcting condition, the plurality of second segments included in the first query is determined, and then the first segment to be corrected in the plurality of second segments is determined according to the history error correcting information and the language model values of the plurality of second segments, and candidate results corresponding to the first segment are recalled according to the history error correcting information base and the preset candidate list. And then, the candidate results are evaluated by using quality feature model to determine the final error correcting result, and the error correction may be performed on the first query according to the error correcting result, so as to generate the second query. With the method according to the present disclosure, it may be judged whether there is an error in the query by using history data, the candidate results are recalled according to history search data, and the candidate results are corrected according to history behaviors of the user, such that personalized demand of the user is satisfied while improving accuracy of error correction, thus improving error correction efficiency and accuracy of the search engine, saving searching time of the user and improving experience of the user.

In order to realize the above embodiments, the present disclosure also provides an apparatus for correcting a query based on artificial intelligence.

Figure 4:
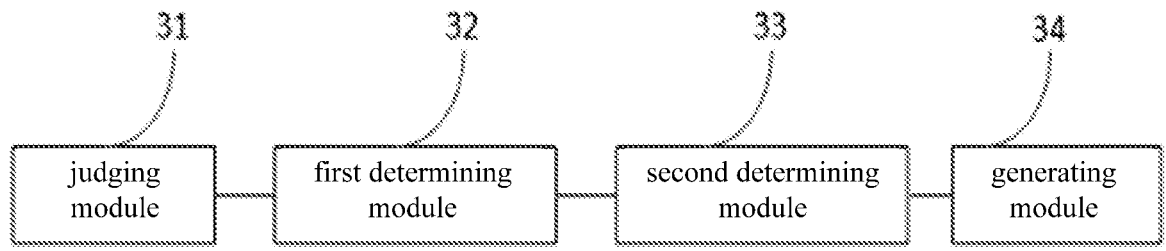
FIG. 4 is a block diagram of an apparatus for correcting a query based on artificial intelligence according to an embodiment of the present disclosure.

FIG. 4 is a block diagram of an apparatus for correcting a query based on artificial intelligence according to an embodiment of the present disclosure.

As shown in FIG. 4, the apparatus includes a judging module 31, a first determining module 32, a second determining module 33, and a generating module 34.

The judging module 31 is configured to receive a first query input by a user, and to judge whether the first query satisfies an error correcting condition according to a preset error correcting strategy.

The first determining module 32 is configured to determine a first segment to be corrected in the first query if the first query satisfies the error correcting condition.

The second determining module 33 is configured to determine an error correcting result corresponding to the first segment.

The generating module 34 is configured to perform an error correction on the first query according to the error correcting result, and to generate a second query.

The judging module 31 is configured to judge whether the first query satisfies the error correcting condition according to a history behavioral feature corresponding to the first query; and/or to judge whether the first query satisfies the error correcting condition according to a language model value of the first query.

In a possible exemplary implementation of this embodiment, the first determining module 32 is configured to perform segmentation on the first query, and to determine a plurality of second segments comprised in the first query; and to determine the first segment to be corrected from the plurality of second segments according to history error correcting information and language model values of the plurality of second segments.

Further, in a possible exemplary implementation of this embodiment, the first determining module 32 is configured to judge whether the history error correcting information and the language model values of each of the plurality of second segments satisfy the error correcting condition successively in a descending order of granularity; to determine a second segment with a large granularity as the first segment to be corrected if the history error correcting information and a language model value of the second segment with the large granularity satisfy the error correcting condition; and to eliminate a second segment with a small granularity included in the second segment with the large granularity from the plurality of second segments.

In a possible exemplary implementation of this embodiment, the second determining module 33 is configured to acquire one or more first candidate results corresponding to the first segment according to a preset candidate recalling strategy, and to determine an error correcting result corresponding to the first segment according to quality feature values of the one or more first candidate results.

In a possible exemplary implementation of this embodiment, the second determining module 33 is further configured to search in a history error correcting information base, and to acquire one or more second candidate results corresponding to the first segment, in which a confidence coefficient of each of the one or more second candidate results is greater than a first preset value; to determine an accuracy score of each of the one or more second candidate results according to a matching degree between each of the one or more second candidate results and the first query; to judge whether there is at least one accuracy score greater than a second preset value; and to determine a second candidate result with a highest accuracy score as an error correcting result if there is at least one accuracy score greater than the second preset value.

Further, the second determining module 33 is configured to establish third queries by using each candidate result corresponding to the first segment in a preset candidate list if there is no accuracy score greater than a second preset value, in which the preset candidate list includes candidate terms similar to the first segment in font or pronunciation; to order the third queries according to quality feature values of the third queries; and to determine the error correcting result according to the ordering result.

It should be noted that the descriptions of the method for correcting a query based on artificial intelligence are also suitable for the apparatus for correcting a query based on artificial intelligence, which will not be described in detail herein.

With the apparatus according to embodiments of the present disclosure, after the first query input by the user is received and it is determined that the first query satisfies the error correcting condition according to the preset error correcting strategy, the first segment to be corrected in the first query may be determined firstly, and one or more first candidate results corresponding to the first segment may be acquired according to the preset candidate recalling strategy thereafter. Then, the correcting result corresponding to the first segment may be determined according to quality feature values of the one or more first candidate results, and the error correction may be performed on the first query according to the error correcting result, so as to generate the second query. With the method according to the present disclosure, it may be accurately determined whether there is an error in the query by using history data, the error correcting results may be precisely determined by screening the candidate results, thus improving error correction efficiency and accuracy of the search engine, saving searching time of the user and improving experience of the user.

Figure 5:
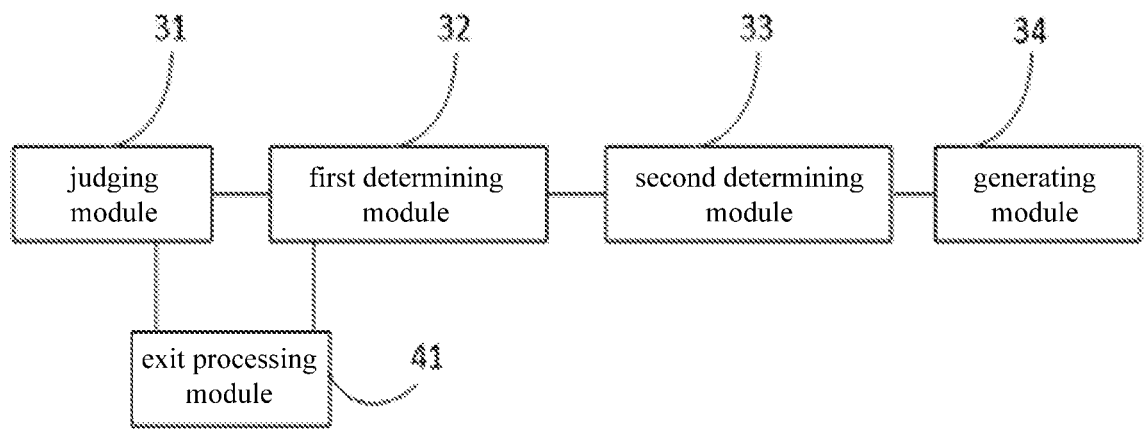
FIG. 5 is a block diagram of an apparatus for correcting a query based on artificial intelligence according to another embodiment of the present disclosure.

FIG. 5 is a block diagram of an apparatus for correcting a query based on artificial intelligence according to another embodiment of the present disclosure.

As shown in FIG. 5, on a basis of FIG. 4, the apparatus also includes an exit processing module 41.

The exit processing module 41 is configured to perform an exit processing on the error correcting result corresponding to the first query if the first query fails to satisfy the error correcting condition.

It should be noted that the descriptions of the method for correcting a query based on artificial intelligence are also suitable for the apparatus for correcting a query based on artificial intelligence, which will not be described in detail herein.

With the apparatus according to embodiments of the present disclosure, after the first query input by the user is received, it is first judged whether the first query satisfies the error correcting condition according to the history behavioral feature and the quality feature value of the first query, after it is determined that the first query satisfies the error correcting condition, the plurality of second segments included in the first query is determined, and then the first segment to be corrected in the plurality of second segments is determined according to the history error correcting information and the language model values of the plurality of second segments, and candidate results corresponding to the first segment are recalled according to the history error correcting information base and the preset candidate list. And then, the candidate results are evaluated by using quality feature model to determine the final error correcting result, and the error correction may be performed on the first query according to the error correcting result, so as to generate the second query. With the method according to the present disclosure, it may be judged whether there is an error in the query by using history data, the candidate results are recalled according to history search data, and the candidate results are corrected according to history behaviors of the user, such that personalized demand of the user is satisfied while improving accuracy of error correction, thus improving error correction efficiency and accuracy of the search engine, saving searching time of the user and improving experience of the user.

Based on the method and the apparatus described above, the present disclosure also provides a device for correcting a query based on artificial intelligence, including: a processor; a memory for storing instructions executed by the processor, in which the processor is configured to receive a first query input by a user, and to judge whether the first query satisfies an error correcting condition according to a preset error correcting strategy; to determine a first segment to be corrected in the first query if the first query satisfies the error correcting condition; to acquire one or more first candidate results corresponding to the first segment according to a preset candidate recalling strategy; to determine an error correcting result corresponding to the first segment according to quality feature values of the one or more first candidate results; and to perform an error correction on the first query according to the error correcting result, and to generate a second query.

Further, the present disclosure also provides a non-transitory computer readable storage medium for storing instructions, when executed by the one or more processors in a mobile terminal, causing the mobile terminal to execute the method according to the above embodiments of the present disclosure.

Further, the present disclosure also provides a computer program product, when instructions in the computer program product are executed by the processor, executing the method according to the above embodiments of the present disclosure.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, such as two or three, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc. Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for correcting a query based on artificial intelligence, comprising:
   receiving a first query input by a user, and judging whether the first query satisfies an error correcting condition according to a preset error correcting strategy;
   determining a first segment to be corrected in the first query if the first query satisfies the error correcting condition;
   acquiring one or more first candidate results corresponding to the first segment according to a preset candidate recalling strategy;
   determining an error correcting result corresponding to the first segment according to quality feature values of the one or more first candidate results; and
   performing an error correction on the first query according to the error correcting result, and generating a second query,
   wherein determining the first segment to be corrected in the first query comprises:
      performing segmentation on the first query, and determining a plurality of second segments comprised in the first query; and
      judging whether history error correcting information and language model values of the plurality of second segments satisfy the error correcting condition successively in a descending order of granularity, wherein the language model values are determined by statistically analyzing titles of search results in a search base and history queries;
      determining a second segment with a large granularity as the first segment to be corrected when history error correcting information and a language model value of the second segment with the large granularity satisfy the error correcting condition; and
      removing, from the plurality of second segments, a second segment with a small granularity included in the second segment with the large granularity.

2. The method according to claim 1, wherein judging whether the first query satisfies an error correcting condition according to a preset error correcting strategy comprises:
   judging whether the first query satisfies the error correcting condition according to a history behavioral feature corresponding to the first query; and/or
   judging whether the first query satisfies the error correcting condition according to a language model value of the first query.

3. The method according to claim 1, after judging whether the first query satisfies an error correcting condition according to a preset error correcting strategy, further comprising:
   replacing on the error correcting result corresponding to the first query with external data if the first query fails to satisfy the error correcting condition,
   wherein the external data comprises feedback information of the user.

4. The method according to claim 1, wherein determining an error correcting result corresponding to the first segment comprises:
   searching in a history error correcting information base, and acquiring one or more second candidate results corresponding to the first segment, wherein a confidence coefficient of each of the one or more second candidate results is greater than a first preset value;
   determining an accuracy score of each of the one or more second candidate results according to a matching degree between each of the one or more second candidate results and the first query;
   judging whether there is at least one accuracy score greater than a second preset value; and
   if there is at least one accuracy score greater than the second preset value, determining a second candidate result with a highest accuracy score as the error correcting result.

5. The method according to claim 4, after judging whether there is at least one accuracy score greater than a second preset value, further comprising:
   if there is no accuracy score greater than a second preset value, establishing third queries by successively using each candidate result corresponding to the first segment in a preset candidate list, wherein the preset candidate list comprises candidate terms similar to the first segment in font or pronunciation;
   ordering the third queries according to quality feature values of the third queries; and
   determining the error correcting result according to an ordering result.

6. An apparatus for correcting a query based on artificial intelligence, comprising:
   one or more processors,
   a memory,
   one or more software modules, stored in the memory, executable by the one or more processors, and comprising:
   a judging module, configured to receive a first query input by a user, and to judge whether the first query satisfies an error correcting condition according to a preset error correcting strategy;
   a first determining module, configured to determine a first segment to be corrected in the first query if the first query satisfies the error correcting condition;
   a second determining module, configured to acquire one or more first candidate results corresponding to the first segment according to a preset candidate recalling strategy, to determine an error correcting result corresponding to the first segment according to quality feature values of the one or more first candidate results; and
   a generating module, configured to perform an error correction on the first query according to the error correcting result, and to generate a second query,
   wherein the first determining module is configured to:
      perform segmentation on the first query, and determine a plurality of second segments comprised in the first query; and
      judge whether history error correcting information and language model values of each of the plurality of second segments satisfy the error correcting condition successively in a descending order of granularity, wherein the language model values are determined by statistically analyzing titles of search results in a search base and history queries;
      determine a second segment with a large granularity as the first segment to be corrected when history error correcting information and a language model value of the second segment with the large granularity satisfy the error correcting condition; and
      remove, from the plurality of second segments, a second segment with a small granularity included in the second segment with the large granularity.

7. The apparatus according to claim 6, wherein the judging module is configured to:
- judge whether the first query satisfies the error correcting condition according to a history behavioral feature corresponding to the first query; and/or
- judge whether the first query satisfies the error correcting condition according to a language model value of the first query.

8. The apparatus according to claim 6, wherein the one or more software modules further comprise:
- an exit processing module, configured to replace on the error correcting result corresponding to the first query with external data if the first query fails to satisfy the error correcting condition,
- wherein the external data comprises feedback information of the user.

9. The apparatus according to claim 6, wherein the second determining module is configured to:
- search in a history error correcting information base, and acquire one or more second candidate results corresponding to the first segment, wherein a confidence coefficient of each of the one or more second candidate results is greater than a first preset value;
- determine an accuracy score of each of the one or more second candidate results according to a matching degree between each of the one or more second candidate results and the first query;
- judge whether there is at least one accuracy score greater than a second preset value; and
- determine a second candidate result with a highest accuracy score as the error correcting result if there is at least one accuracy score greater than the second preset value.

10. The apparatus according to claim 9, wherein the second determining module is configured to:
- establish third queries by successively using each candidate result corresponding to the first segment in a preset candidate list if there is no accuracy score greater than a second preset value, wherein the preset candidate list comprises candidate terms similar to the first segment in font or pronunciation;
- order the third queries according to quality feature values of the third queries; and
- determine the error correcting result according to an ordering result.

11. A non-transitory computer readable storage medium comprising instructions, wherein when the instructions are executed by a processor of a device to perform acts of:
- receiving a first query input by a user, and judging whether the first query satisfies an error correcting condition according to a preset error correcting strategy;
- determining a first segment to be corrected in the first query if the first query satisfies the error correcting condition;
- acquiring one or more first candidate results corresponding to the first segment according to a preset candidate recalling strategy;
- determining an error correcting result corresponding to the first segment according to quality feature values of the one or more first candidate results; and
- performing an error correction on the first query according to the error correcting result, and generating a second query,
- wherein determining the first segment to be corrected in the first query comprises:
  - performing segmentation on the first query, and determining a plurality of second segments comprised in the first query; and
  - judging whether history error correcting information and language model values of the plurality of second segments satisfy the error correcting condition successively in a descending order of granularity, wherein the language model values are determined by statistically analyzing titles of search results in a search base and history queries;
  - determining a second segment with a large granularity as the first segment to be corrected when history error correcting information and a language model value of the second segment with the large granularity satisfy the error correcting condition; and
  - removing, from the plurality of second segments, a second segment with a small granularity included in the second segment with the large granularity.

12. The non-transitory computer readable storage medium according to claim 11, wherein judging whether the first query satisfies an error correcting condition according to a preset error correcting strategy comprises:
- judging whether the first query satisfies the error correcting condition according to a history behavioral feature corresponding to the first query; and/or
- judging whether the first query satisfies the error correcting condition according to a language model value of the first query.

* * * * *